United States Patent
Richter et al.

(10) Patent No.: US 8,657,359 B2
(45) Date of Patent: Feb. 25, 2014

(54) FOLDING TOP FOR A CONVERTIBLE, COMPRISING AT LEAST TWO ROOF SEGMENTS AND A ROOFLINER

(76) Inventors: Markus Richter, Tecklenburg (DE); Udo Rademacher, Osnabruck (DE)

(*) Notice: Subject to any disclaimer, the term of this patent is extended or adjusted under 35 U.S.C. 154(b) by 34 days.

(21) Appl. No.: 13/142,693

(22) PCT Filed: Dec. 15, 2009

(86) PCT No.: PCT/DE2009/001769
§ 371 (c)(1), (2), (4) Date: Sep. 28, 2011

(87) PCT Pub. No.: WO2010/075843
PCT Pub. Date: Jul. 8, 2010

(65) Prior Publication Data
US 2012/0007384 A1    Jan. 12, 2012

(30) Foreign Application Priority Data
Dec. 29, 2008   (DE) .......................... 10 2008 063 216

(51) Int. Cl.
*B60J 7/14*    (2006.01)

(52) U.S. Cl.
USPC ...................................... 296/107.06; 296/111

(58) Field of Classification Search
USPC ............ 296/107.06, 107.09, 107.11, 107.01, 296/107.12, 117, 108, 121, 122
See application file for complete search history.

(56) References Cited

U.S. PATENT DOCUMENTS

| | | | | |
|---|---|---|---|---|
| 2,708,137 | A | * | 5/1955 | Poelman .................. 296/107.06 |
| 3,642,317 | A | | 2/1972 | Swindlehurst |
| 4,516,803 | A | * | 5/1985 | Kaltz et al. ............... 296/107.09 |
| 4,964,668 | A | * | 10/1990 | Hofmann ................. 296/107.06 |
| 6,318,791 | B1 | | 11/2001 | Pfertner |
| 6,340,197 | B1 | * | 1/2002 | Windpassinger ........ 296/107.11 |
| 6,715,823 | B2 | * | 4/2004 | Schmitt et al. ................ 296/225 |
| 2006/0152034 | A1 | | 7/2006 | Schonenbach |
| 2010/0225146 | A1 | | 9/2010 | Richter et al. |

FOREIGN PATENT DOCUMENTS

| | | |
|---|---|---|
| DE | 240365 C | 10/1911 |
| DE | 4127387 A1 | 3/1992 |
| DE | 102005027511 A1 | 12/2006 |

* cited by examiner

*Primary Examiner* — Glenn Dayoan
*Assistant Examiner* — Sunsurraye Westbrook
(74) *Attorney, Agent, or Firm* — Gifford, Krass, Sprinkle, Anderson & Citkowski, P.C.

(57) ABSTRACT

A folding top (3) for a convertible is disclosed, with at least two roof segments (7), which can be moved by means of a folding top linkage (11) between a closed position covering a passenger compartment (10) and an open position uncovering at least some areas of the passenger compartment (10), and with an interior ceiling (15) facing the passenger compartment (10), which has at least one zone (18) that is loosely guided relative to at least one roof segment (7). At least one wire-type shaping element (19) cooperates with the interior ceiling (15) in order to shape the interior ceiling (15).

10 Claims, 4 Drawing Sheets

Figure 1:
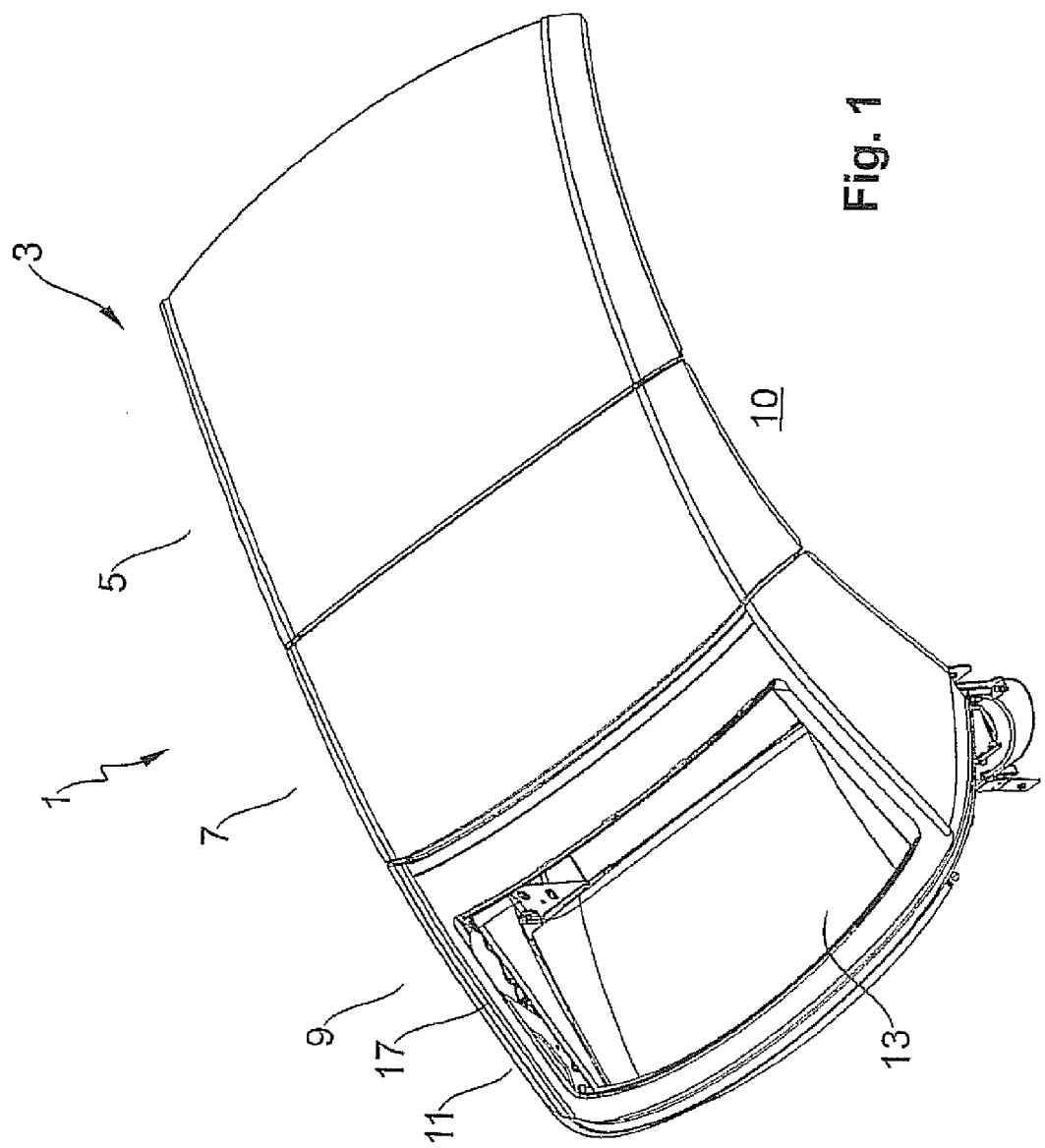

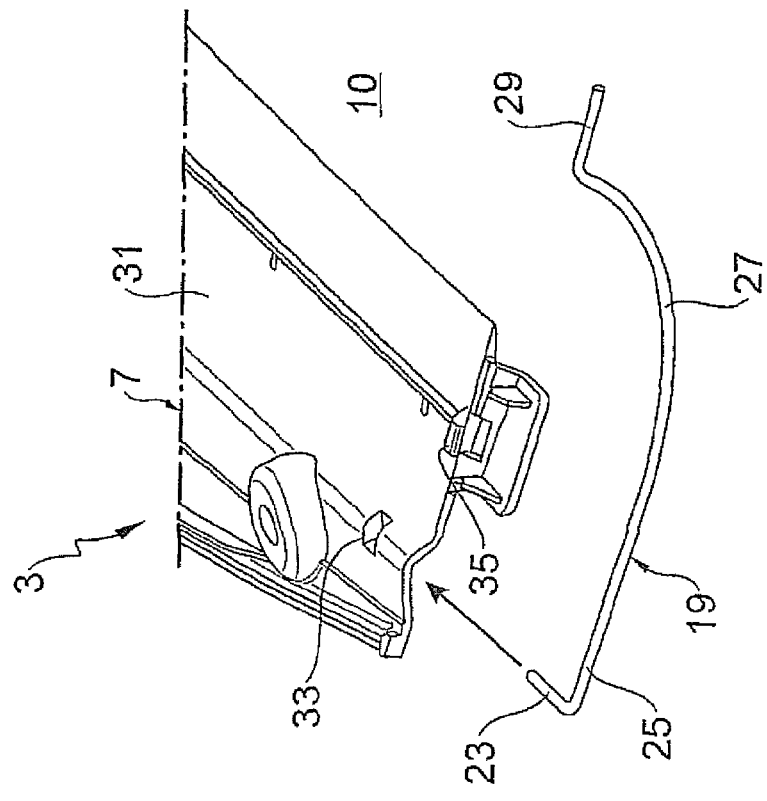
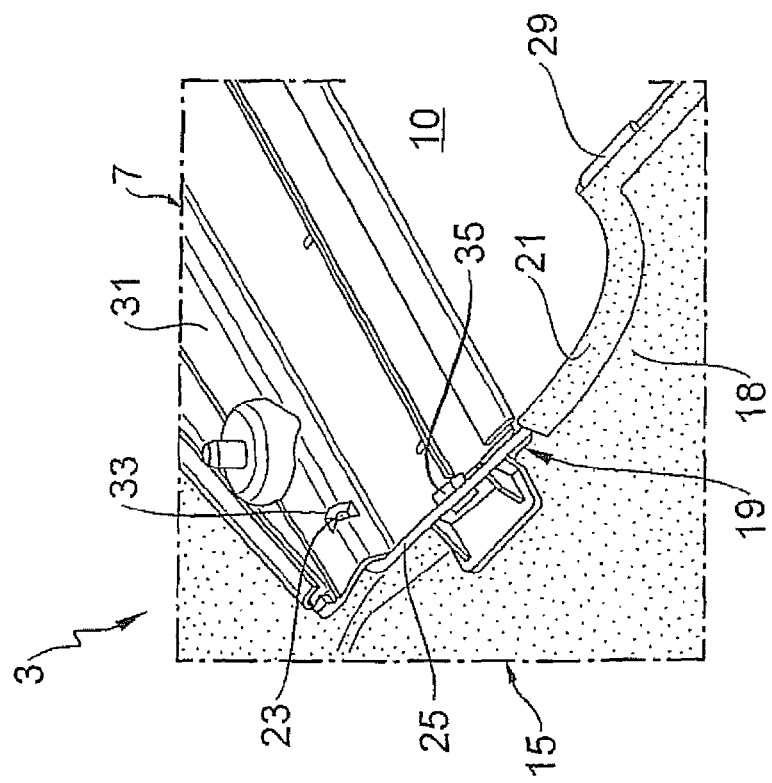

FOLDING TOP FOR A CONVERTIBLE, COMPRISING AT LEAST TWO ROOF SEGMENTS AND A ROOFLINER

REFERENCE TO RELATED APPLICATIONS

This application is the United States national phase application of PCT/DE2009/001769, filed Dec. 15, 2009, which claims priority to German Patent Application No. DE102008063216.3, filed Dec. 29, 2008, the entire content of which each application is incorporated herein by reference.

The invention relates to a folding top for a convertible, comprising at least two roof segments, which can be moved by means of a folding top linkage between a closed position covering a passenger compartment and an open position uncovering at least some areas of the passenger compartment and with a interior ceiling, which faces the passenger compartment, in accordance with the type defined in further detail in the pre-characterizing part of claim 1.

From DE 199 21 305 B4 a folding top is known for a motor vehicle, in particular for a passenger car. The folding top is composed of a folding top structure and a top cover mounted on an exterior side on the top structure, wherein the top structure, cooperating with top bearings arranged on the body side comprises a rigid front top section with a large surface extending adjacent to the windscreen frame, a main bow and a rear-side tensioning bow. On the side of the top structure facing the passenger compartment, an interior ceiling is provided here, which is composed of a central part and two side parts connected to the longitudinal sides of the central part. In a shared connecting region of central part and side part, on the side of the interior ceiling facing away from the passenger compartment a longitudinally-extending holding loop is arranged, through which a holding cable can be guided and which fixes the interior ceiling, loosely arranged in this region on the top structure, in the closed position of the folding top.

Disadvantageously, with such a construction of the folding top, the forces transferred from the holding cable via the holding loop in the transverse direction of the vehicle for tensioning the interior ceiling are small, so that a desired tensioning of the interior ceiling in the transverse direction of the vehicle can not be guaranteed, or can only be guaranteed with considerable complexity.

Furthermore, an abutting of such an interior ceiling is only possible against substantially plain surfaces, so that the freedom of design for the folding top is disadvantageously limited.

It is an object of the present invention to provide a folding top for a convertible, in which an interior ceiling, when the folding top is closed, can be placed also on complex shapes of the folding top with a desired tension, and in a simple and favourably priced manner.

This problem is solved in a folding top of a convertible of the type named in the introduction according to the features of the characterizing part of claim 1. Advantageous further embodiments of a folding top of a convertible will be apparent from the sub-claims.

Therefore, a folding top of a convertible is proposed, having at least two roof segments which are able to be moved by means of a folding top linkage between a closed position covering the passenger compartment and an open position uncovering at least some areas of the passenger compartment, and with an interior ceiling facing the passenger compartment, which has at least one zone that is loosely guided relative to at least one roof segment. According to the invention, provision is made here that at least one wire-type shaping element cooperates with the interior ceiling in order to shape the interior ceiling.

A folding top according to the invention, which can be constructed both as a soft top folding top and as a hard top folding top, has the advantage that a shape of the interior ceiling can be preset in a very simple and flexible manner by means of the at least one wire-type shaping element. Through the fact that the wire-type shaping element can be constructed in various types of shapes, the shape of the interior ceiling can correspondingly be formed in a diverse manner, and is able to be adapted respectively to the preset basic conditions of the respective folding top in a particularly simple manner.

By means of the at least one wire-type shaping element, with a correspondingly rigid embodiment of the shaping element advantageously both a guiding of the interior ceiling in the longitudinal direction of the folding top and also a guiding of the interior ceiling in the transverse direction of the folding top can be achieved.

In addition, the wire-type shaping element makes possible a defined storage of the interior ceiling in the open position of the folding top in an advantageously simple manner.

In an advantageous embodiment of a folding top according to the invention, the loose zone of the interior ceiling in the closed folding top position can be held against the roof segment or respectively a cover element replicating the shape of the at least one roof segment or the shape of a cover element covering the at least one roof segment. As the wire-type shaping element is able to be designed in a very flexible manner, a defined abutting against the at least one roof segment or respectively the covering element can be ensured in a particularly simple manner even in the case of complex shapes of the roof segment or respectively of the covering element.

When the loose zone of the interior ceiling is arranged at least partially rearwards of a front roof segment and the wire-type shaping element forms there a free end which is loosely connected with a rear roof segment or respectively the covering element, a secure abutting of the interior ceiling against the roof segments or respectively the cover element is possible in the case of various movements of the folding top, thus e.g. also in the case of folding top mechanisms in which the rear roof segment, on opening of the folding top, is initially moved in the vertical direction of the vehicle and hence no fixed connection of the interior ceiling to the rear roof segment is possible. Through the wire-type shaping element, the interior ceiling can also be held without a connection with the rear roof segment in closed position of the top in a simple manner in abutment with the rear roof segment or respectively with a cover element covering the rear roof segment.

A folding top according to the invention can also comprise more than two roof segments arranged one behind the other in the longitudinal direction of the vehicle in closed position of the folding top. The terms "front roof segment" and "rear roof segment" which are used here refer here to two roof segments in particular directly adjoining each other respectively in the closed position of the folding top.

An embodiment of a folding top according to the invention is able to be used in an accordingly versatile manner even in the case of complex folding top mechanisms, wherein only the invention allows the realization of an also visually attractive arrangement of the interior ceiling in the closed position of the folding top in the case of complex folding top mechanisms. In addition, through the loose connection of the interior ceiling to, for example, a rear roof segment great forces acting on the interior ceiling during an opening or respectively closing movement of the folding top are advantageously prevented.

In a further advantageous embodiment of the top according to the invention, the rear roof segment has a rear window and, when the top is closed, is arranged in the region of a C-column of a vehicle body. Thereby it is achieved in a simple manner that the interior ceiling is applied as closely as possible onto the second or rear roof segment respectively, when the top is closed, and for example in four-seater convertibles, as large an amount of headroom as possible is available in the rear seat region for persons on the rear passenger seats.

A particularly stable abutment of the interior ceiling against at least one roof segment or a cover element respectively is achieved in an advantageous embodiment of the invention in that an end of the wire-type shaping element, facing away from the free end, is arranged on a dimensionally stable component which may, in particular, be a component of the front roof segment. Hereby, a favourable supporting effect of the interior ceiling on the front roof segment can be guaranteed and a secure abutting of the interior ceiling against the rear roof segment or respectively the cover element of the rear roof segment in particular in the closed folding top position can be ensured.

The end of the wire-type shaping element, facing away from the free end, can be connectable with the dimensionally stable component with all known types of fastening, wherein it is advantageous in particular if the end of the wire-type shaping element facing away from the free end can be connectable via a clip connection with the dimensionally stable component, so that the interior ceiling can be arranged in a simple and quick manner against the front roof segment.

In a simple embodiment of the invention, it is possible that the wire-type shaping element is arranged in a loop-like edge region or hem of the interior ceiling, and is therefore connected with the interior ceiling or cooperates with the interior ceiling in particular in the transverse direction of the folding top in a defined manner.

Further advantages and advantageous embodiments of a folding top of a convertible according to the invention will be apparent from the drawings and the description.

Figure 2:
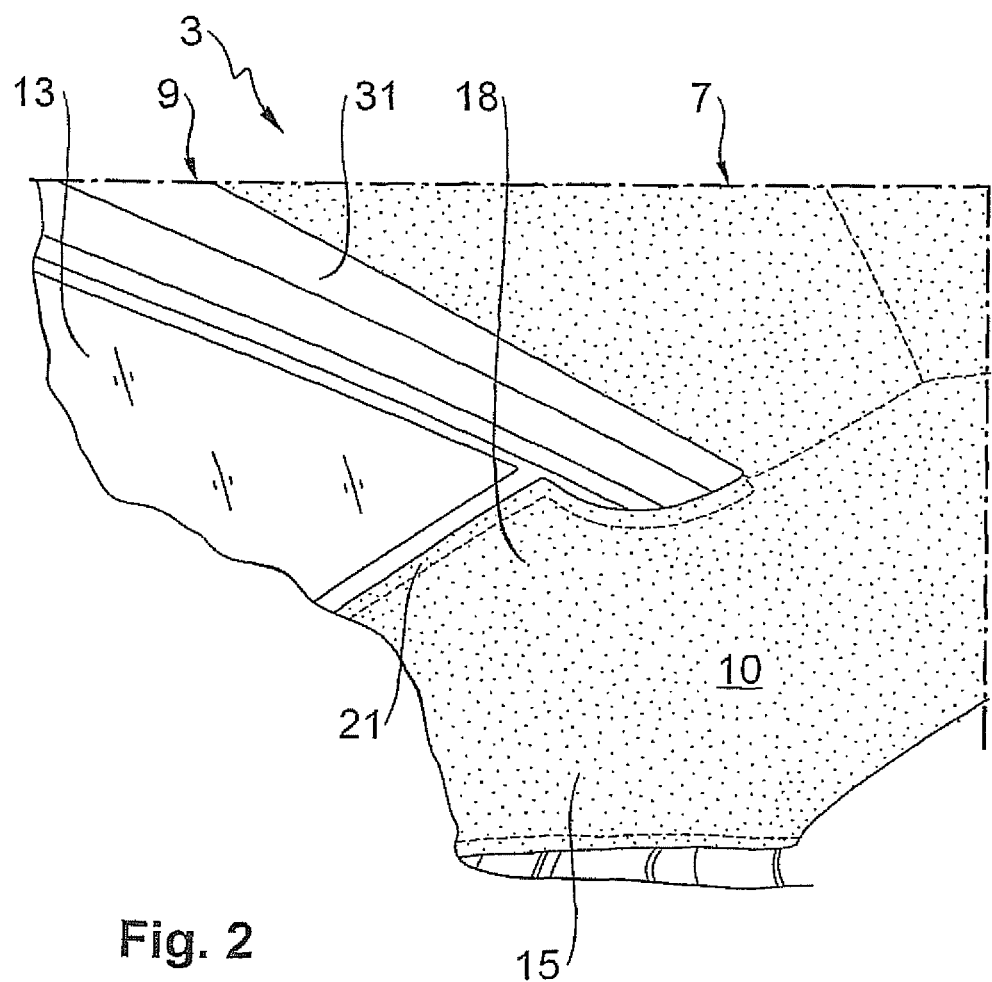
Figure 3:
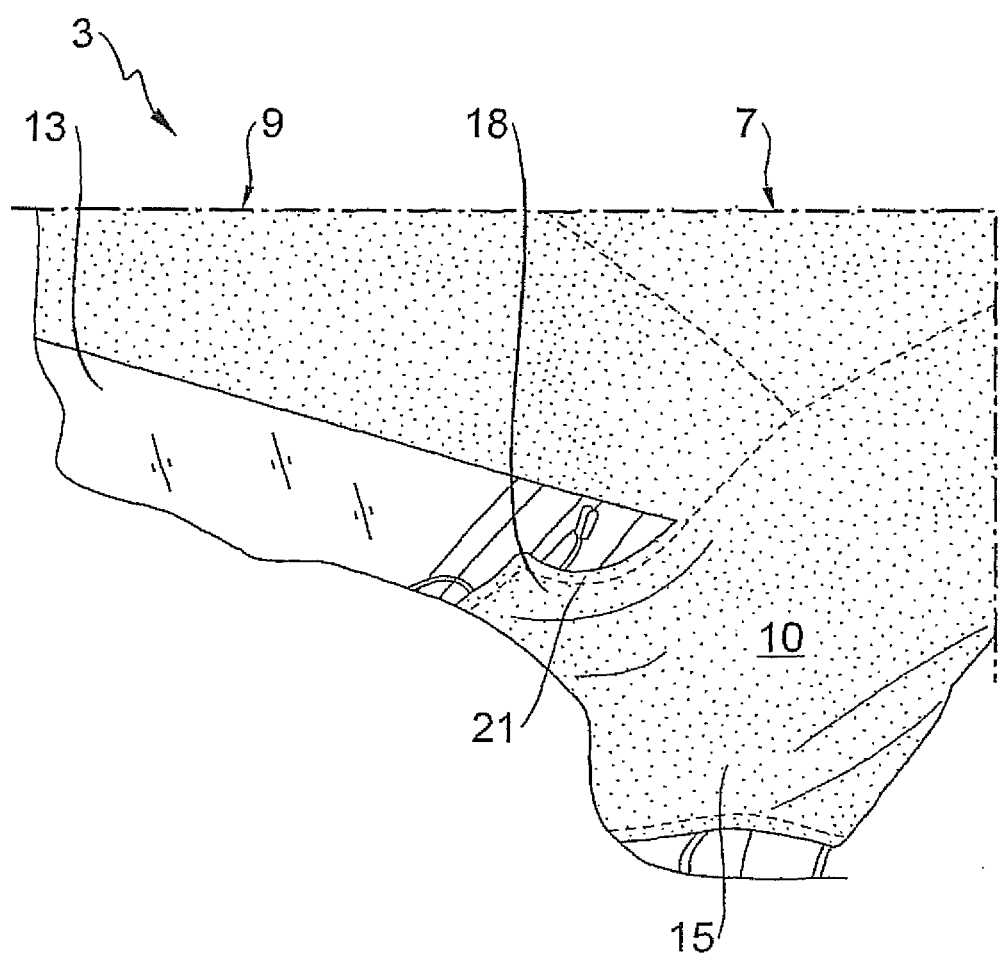

An advantageous example embodiment of a folding top of a convertible is described below in principle with the aid of the drawings, in which illustrates:

FIG. 1 a simplified perspective top view onto a folding top shown alone, wherein the folding top, constructed here with three roof segments, is illustrated in a closed position;

FIG. 2 a simplified partial view of the folding top of FIG. 1 from the direction of a passenger compartment, wherein an interior ceiling lining the folding top can be seen;

FIG. 3 a view of the folding top corresponding to FIG. 2, wherein the folding top is illustrated in a partially opened position;

FIG. 4 a simplified three-dimensional view of a part of the folding top of FIGS. 1 to 3, wherein a wire-type shaping element can be seen arranged in a side region of the interior ceiling and arranged on a dimensionally stable component of a central roof segment of the folding top; and FIG. 5 a three-dimensional view of the dimensionally stable component of the central roof segment and of the wire-type shaping element which are shown alone.

With reference to FIG. 1, a folding top 3 of a convertible can be seen, which is constructed in a dimensionally stable manner as a so-called "Retractable Hard Top" (RHT). The folding top 3 comprises three rigid roof segments 5, 7 and 9, which are able to be moved via a folding top linkage 11 between the state covering a passenger compartment 10, illustrated in FIG. 1, and a state, not illustrated in further detail, stored in a storage space on the rear side.

The first front roof segment 5 is connectable with a windscreen frame of the convertible 1, when the folding top is closed. In the closed folding top position, adjoining the front roof segment 5 rearwards is the second central roof segment 7, and adjoining thereto on the rear side follows the third rear roof segment 9, having a rear window 13.

In each of FIGS. 2 and 3, a view is shown from the direction of the passenger compartment 10 onto a rearward region of the folding top 3, wherein the folding top 3 in FIG. 2 is illustrated in a closed position and in FIG. 3 in a partially opened position, in which the rear roof segment 9 is raised in the vertical direction of the folding top with respect to the central roof segment 7. With a further opening of the folding top, the central roof segment 7 is moved under the rear roof segment 9 and is stored together therewith.

For the visually attractive design of the passenger compartment 10, the roof segments 5, 7 and 9 and the folding top linkage 11 are covered with respect to the passenger compartment 10 by an interior ceiling 15, wherein the interior ceiling 15 also in its side regions abuts closely on cover elements 17 of the roof segments 7, 9.

In the case of a transferring of the folding top 3 from its closed position into its open position, the rear roof segment 9 is firstly moved in the vertical direction of the vehicle. In order to prevent the occurrence of high stresses or a damage respectively to the interior ceiling during an opening movement of the folding top, the interior ceiling 15 may therefore not be connected to the rear roof segment 9 in the region of the rear roof segment 9.

Nevertheless, in order to ensure a close abutting of the interior ceiling 15 on the rear roof segment 9 in this loose zone 18 of the interior ceiling 15 in the closed position of the folding top, the interior ceiling 15 has a dimensionally stable wire-type shaping element 19 which can be seen in further detail in FIGS. 4 and 5, and which is arranged in an edge region 21 of the interior ceiling 15 constructed as a hem, and which holds the interior ceiling 15 with its loose zone 18 also without a connection to the rear roof segment 9 in a defined position, as can also be seen from FIG. 3.

The wire-type shaping element 19 which can be seen in FIGS. 4 and 5 is associated with a left side of the folding top. On a right side of the folding top, a similarly constructed wire-type shaping element is provided, with the shaping element 19 being described below as a representative for this.

The wire-type shaping element 19 is constructed with a first section 23 in its front end region extending towards the front side of the folding top, which first section 23 extends in the transverse direction of the folding top towards a centre of the folding top. Rearwards, adjoining this first section 23 is a second section 25 which is curved substantially at right angles to the first section 23, which second section 25 firstly extends straight in the longitudinal direction of the folding top, and is curved in a third section 27 approximately in the form of a quadrant in the direction of a centre of the folding top at approximately the half of the longitudinal extent of the shaping element 19. A straight free end 29 of the wire-type shaping element 19 extends rearwards of and adjoining to the circular third section 27, and is again curved approximately at right angles in the longitudinal direction of the folding top.

The course of the wire-type shaping element 19 is selected in a manner that it is aligned with the adjoining cover elements 17, and that the interior ceiling 15, in the closed folding top position, abuts closely to the cover elements 17.

In an alternative embodiment of the invention, a wire-type shaping element can be configured differently in any desired manner and can be adapted to various shapes of roof segments or cover elements, respectively. In addition, the wire-type shaping element can be arranged at any desired locations of the interior ceiling, wherein also several wire-type shaping elements can be provided.

In the region of the first section 23 and of the second section 25, the wire-type shaping element 19 is arranged on a dimensionally stable component 31 of the central roof segment 7, wherein the wire-type shaping element 19 is inserted for this with its first section 23 in a recess 33 of the dimensionally stable component 31, and is secured by means of a clip connection 35 on the dimensionally stable component 31 in the region of its second section 25.

For cooperation with the interior ceiling 15, the wire-type shaping element 19 is arranged at least in the third section 27 and with the free end 29 in the loop-like formed edge region 21 of the interior ceiling, so that forces can be transferred from the wire-type shaping element 19 onto the interior ceiling 15 in particular in the loose zone 18 for tensioning the interior ceiling 15 in the longitudinal direction of the folding top and in the transverse direction of the folding top.

The lateral edge region 21 of the interior ceiling 15 is constructed here as a bead-shaped hem, wherein the bead-shaped hem abuts on the respective roof segment 7, 9 or cover element 17 in the closed position of the folding top.

Basically, the wire-type shaping element 19, which is formed here from metal, but may in principle also be formed from a plastic material, allows an improved retaining of the interior ceiling 15 when the vehicle roof is closed, which interior ceiling 15 can not be connected securely on the roof segments due to the spaces between the roof segments 5, 7, 9 occurring during a movement of the folding top. The wire-type shaping element 19, which is favourably priced per se, is operatively connected in a simple manner with the interior ceiling, and tensions the interior ceiling to the desired extent, when the folding top is closed, as well as draws it against the rear roof segment 9 and secures it there.

The invention claimed is:

1. A folding top for a convertible, comprising:
   at least two roof segments, which can be moved by means of a folding top linkage between a closed position covering a passenger compartment and an open position uncovering at least some areas of the passenger compartment;
   an interior ceiling facing the passenger compartment when the roof segments are in the closed position, the interior ceiling having at least one zone that is loosely guided relative to at least one of the roof segments; and
   at least one wire-type shaping element cooperating with the interior ceiling in order to shape the interior ceiling, the at least one wire-type shaping element being curved;
   wherein the roof segments are movable between the open and closed positions without detaching the interior ceiling.

2. A folding top according to claim 1, wherein:
   the loosely guided zone of the interior ceiling is held against the respective roof segment when the roof segments are in the closed position, thereby replicating the shape of the respective roof segment.

3. A folding top according to claim 1, further comprising:
   at least one cover element covering one of the roof segments;
   the loosely guided zone of the interior ceiling being held against the at least one cover element, thereby replicating the shape of the at least one cover.

4. A folding top according to claim 1, wherein:
   the loose zone of the interior ceiling is disposed at least partially rearwards of a front one of the roof segments, and the wire-type shaping element has a free end loosely connected with a rear one of the roof segments.

5. A folding top according to claim 4, wherein:
   the rear one of the roof segments has a rear window and is arranged in the region of a C-column of a vehicle body, when the roof segments are in the closed position.

6. A folding top according to claim 4, wherein:
   the wire-type shaping element has a front end opposite its free end, the front end being connected to a dimensionally stable component of the folding top.

7. A folding top according to claim 6, wherein:
   the dimensionally stable component is a component of the roof segment forward of the rear roof segment.

8. A folding top according to claim 6, wherein:
   the front end of the wire-type shaping element is secured to the dimensionally stable component.

9. A folding top according to claim 8, wherein:
   the front end of the wire-type shaping element is secured to the dimensionally stable component by a clip connection.

10. A folding top according to claim 1, wherein:
    the interior ceiling has a loop-like hem at an edge region thereof, the wire-type shaping element being disposed in the loop-like hem.

* * * * *